(12) United States Patent
Jinnai et al.

(10) Patent No.: US 11,634,100 B2
(45) Date of Patent: Apr. 25, 2023

(54) AIRBAG MODULE FOR A CURTAIN-TYPE AIRBAG

(71) Applicant: Toyoda Gosei Co., Ltd., Kiyosu (JP)

(72) Inventors: Ryosuke Jinnai, Novi, MI (US); Daniel Bujaidar, Washington Township, MI (US); Roy Deutschmann, South Lyon, MI (US)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 17/400,413

(22) Filed: Aug. 12, 2021

(65) Prior Publication Data
US 2023/0050754 A1    Feb. 16, 2023

(51) Int. Cl.
*B60R 21/232* (2011.01)
*B60R 21/201* (2011.01)
*B60R 21/231* (2011.01)
*B60R 21/213* (2011.01)

(52) U.S. Cl.
CPC .......... *B60R 21/232* (2013.01); *B60R 21/201* (2013.01); *B60R 21/23138* (2013.01); *B60R 21/213* (2013.01)

(58) Field of Classification Search
CPC ... B60R 21/232; B60R 21/201; B60R 21/213; B60R 21/23138; B60R 21/215; B60R 21/20

USPC ............................................ 280/728.2, 730.2
See application file for complete search history.

(56) References Cited

U.S. PATENT DOCUMENTS

| | | | |
|---|---|---|---|
| 2003/0047920 A1 | 3/2003 | Tanase et al. | |
| 2005/0029789 A1* | 2/2005 | Chapman | B60R 21/20 280/743.2 |
| 2005/0082798 A1* | 4/2005 | Tallerico | B60R 21/201 280/730.2 |
| 2011/0057422 A1 | 3/2011 | Cheal et al. | |
| 2015/0291119 A1 | 10/2015 | Noma et al. | |
| 2018/0111579 A1* | 4/2018 | Shimizu | B60R 21/201 |
| 2019/0299907 A1 | 10/2019 | Jinnai et al. | |
| 2021/0094501 A1 | 4/2021 | Kakimoto | |

FOREIGN PATENT DOCUMENTS

EP            1710136 A1 * 10/2006  .......... B60R 21/201

* cited by examiner

*Primary Examiner* — Keith J Frisby
(74) *Attorney, Agent, or Firm* — Christopher G. Darrow; Darrow Mustafa PC (57) ABSTRACT

An airbag module includes a curtain-type airbag arranged in a packaged configuration, and a strap looped around the airbag. The airbag includes a mounting edge extending exteriorly along the airbag. The mounting edge includes a securement adaptor projecting therefrom exteriorly to the airbag. The strap includes two endpieces respectively anchored to the mounting edge and secured with the securement adaptor, thereby securing the strap in a loop around the airbag at the mounting edge.

20 Claims, 4 Drawing Sheets

AIRBAG MODULE FOR A CURTAIN-TYPE AIRBAG

TECHNICAL FIELD

The embodiments disclosed herein relate to vehicles equipped with airbags and, more particularly, to airbag modules for curtain-type airbags.

BACKGROUND

Airbags are standard equipment on many new vehicles. For instance, many new vehicles are equipped with airbag modules for side curtain and other curtain-type airbags. As part of the airbag modules, the airbags are arranged in packaged configurations, and configured for inflation-induced expansion to deployed configurations. Upon the arrangement of the airbags in the packaged configurations, vehicle manufacturers and airbag module manufacturers, among others, may desire airbag modules with improved features for packaging the relatively flexible airbags for handling.

SUMMARY

Disclosed herein are embodiments of an airbag module. In one aspect, an airbag module includes a curtain-type airbag arranged in a packaged configuration, and a strap looped around the airbag. The airbag includes a mounting edge extending exteriorly along the airbag. The mounting edge includes a securement adaptor projecting therefrom exteriorly to the airbag. The strap includes two endpieces respectively anchored to the mounting edge and secured with the securement adaptor, thereby securing the strap in a loop around the airbag at the mounting edge.

In another aspect, an airbag module includes a curtain-type airbag arranged in a packaged configuration, a strap looped around the airbag, and a case fitted over the airbag and the strap. The airbag includes a mounting edge extending exteriorly along the airbag. The mounting edge includes a securement adaptor and a mounting tab projecting therefrom exteriorly to the airbag. The securement adaptor and the mounting tab are spaced apart from one another along the mounting edge. The strap includes two endpieces respectively anchored to the mounting edge and secured with the securement adaptor, thereby securing the strap in a loop around the airbag at the mounting edge. The case includes a mounting edge wall extending along the case over the mounting edge, and a mounting bracket projecting from the mounting edge wall exteriorly to the case. The mounting edge wall includes a receiver, and a slot opening therethrough to the mounting bracket. The receiver and the slot and the mounting bracket are spaced apart from one another along the case. The receiver receives and is secured with the securement adaptor, and with the mounting tab projecting to the mounting bracket through the slot, the mounting bracket is attached with the mounting tab.

In yet another aspect, an airbag module includes a curtain-type airbag arranged in a packaged configuration, a strap looped around the airbag, and a case fitted over the airbag and the strap. The airbag includes a mounting edge extending exteriorly along the airbag. The mounting edge includes a securement adaptor. The securement adaptor includes at least one projection projecting from the mounting edge exteriorly to the airbag. The strap includes two endpieces respectively anchored to the mounting edge and hooked with the at least one projection, thereby securing the strap in a loop around the airbag at the mounting edge. The case includes a mounting edge wall extending along the case over the mounting edge. The mounting edge wall includes a receiver receiving and secured with the at least one projection.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

With reference to a vehicle equipped therewith, this disclosure teaches an airbag module for a curtain-type airbag. As part of the airbag module, the airbag is arranged in a packaged configuration, with a mounting edge extending exteriorly along the airbag. In addition to the airbag, the airbag module includes a strap and a case.

Using a collaborative relationship between the features of the airbag, the strap, and the case, the airbag module packages the relatively flexible airbag for handling. Specifically, the mounting edge includes a securement adaptor projecting therefrom exteriorly to the airbag, the strap includes two endpieces, and the case includes a receiver as part of a mounting edge wall extending along the case. During the assembly of the airbag module, the endpieces are respectively anchored to the mounting edge and secured with the securement adaptor, thereby securing the strap in a loop around the airbag at the mounting edge, whereby the strap maintains the packaged configuration. The case is fitted over the airbag, including, with the strap secured in a loop around the airbag at the mounting edge, over the airbag and the strap. With the mounting edge wall extending over the mounting edge, the receiver receives and secures with the securement adaptor.

As described in additional detail below, the strap, among other things, advantageously promotes user-friendly, error-proof, and reliable anchoring and securement, maintains the packaged configuration without influencing the circumferential alignment of the mounting edge or the angular orientation of the airbag, and is locatable along the mounting edge at the location best suited for maintaining the packaged configuration.

Figure 1A:
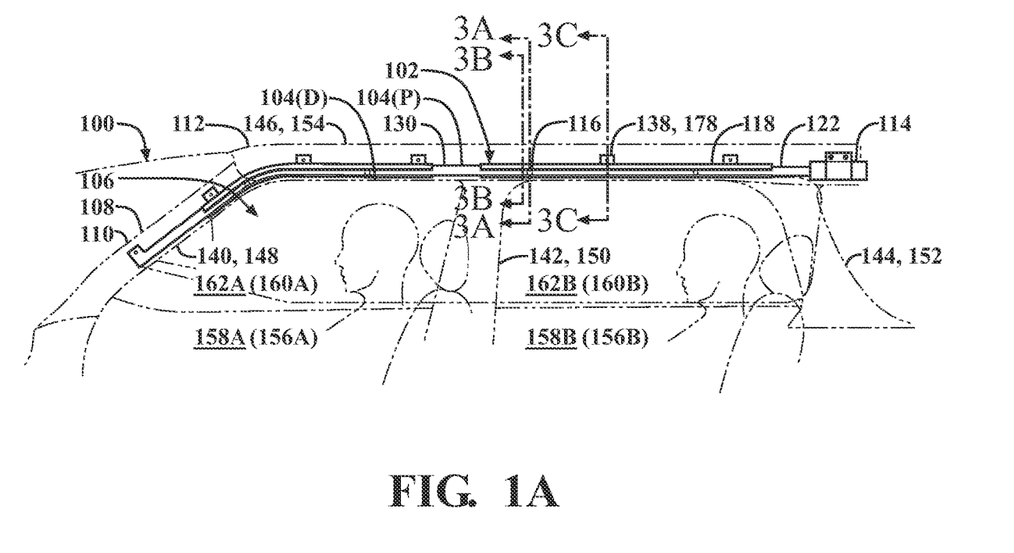
FIG. 1A is a cutaway side view of a vehicle whose body and passenger compartment are partially illustrated with phantom lines, showing an airbag module that includes a curtain-type airbag arranged in a packaged configuration, straps looped around the airbag, and cases fitted over the airbag and the straps.

A representative passenger vehicle 100 equipped with an airbag module 102 for a curtain-type airbag 104 is shown in FIG. 1A. The vehicle 100 includes an exterior and a number of interior compartments. The compartments include a passenger compartment 106, as well as an engine compartment, a cargo area, and the like. The vehicle 100 includes a body 108 that forms the exterior and defines the compartments. The body 108 includes two upright sides 110 and a horizontal roof 112, as well as a horizontal floor, an upright front end, an upright rear end, and the like, extending between the sides 110. One side 110 is shown, with the other side 110 being a mirror image. This description follows with reference to a representative side 110. However, it will be understood that this disclosure is applicable in principle to the other side 110.

The vehicle 100 may include, among other things, seats and a dash assembly housed in the passenger compartment 106. Additionally, the vehicle 100 may include any combination of an engine, one or more motors, a transmission, and other powertrain components housed in the engine compartment, underneath the floor, or elsewhere in the vehicle 100. Among the other powertrain components, the vehicle 100 includes wheels. The wheels support the remainder of the vehicle 100 on the ground. One, some, or all of the wheels are powered by the remainder of the powertrain components to drive the vehicle 100 along the ground.

As part of the airbag module 102, the airbag 104 is arranged in a packaged configuration P (illustrated in FIG. 1A with solid lines). From the packaged configuration P, the airbag 104 is configured for inflation-induced expansion to a deployed configuration D (illustrated in FIG. 1A with phantom lines). In addition to the airbag 104, and an inflator 114 for inflating the airbag 104, the airbag module 102 includes one or more straps 116 looped around the airbag 104, and one or more cases 118 fitted over the airbag 104 and the straps 116. Although the airbag module 102, as shown, is for a side curtain airbag 104, it will be understood that this disclosure is applicable in principle to an otherwise similar airbag module 102 for another curtain-type airbag 104.

Figure 1B:
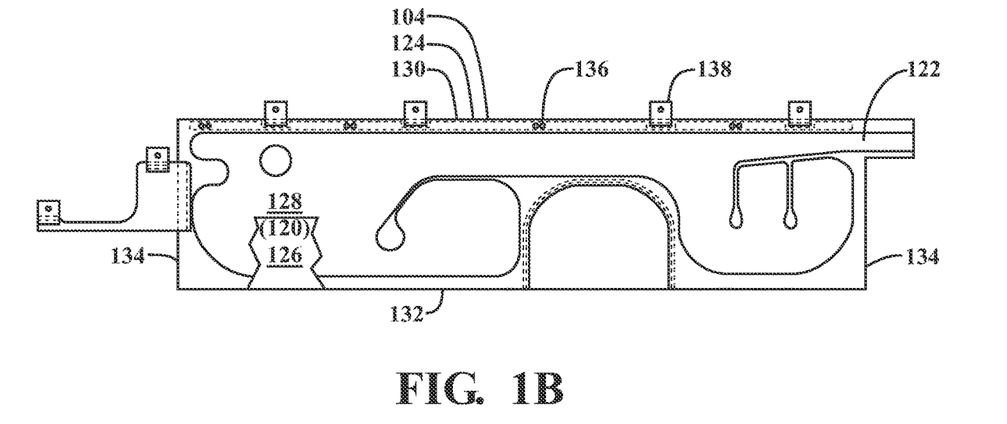
FIG. 1B is a side view of the airbag, showing, among other things, a mounting edge including securement adaptors and mounting tabs.

As shown with additional reference to FIG. 1B, the airbag 104 includes a flexible, inflatable, curtain-like construction. As part of its construction, the airbag 104 includes an inflation chamber 120, an inflation port 122 for the inflation chamber 120, and a bordering area 124 around the inflation chamber 120. As shown, in a double-layer implementation, the airbag 104 includes a back layer 126 and a front layer 128. The back layer 126 and the front layer 128 are stitched, adhered, welded, and/or otherwise connected with one another at the bordering area 124, and left unconnected from one another at the inflation chamber 120. In the airbag module 102, the inflator 114 and the inflation port 122 are sealed with one another. The inflator 114 is operable to inflate the airbag 104 by introducing inflation gas to the inflation chamber 120 through the inflation port 122. Although the airbag 104, as shown, includes one inflation chamber 120 and one inflation port 122, it will be understood that this disclosure is applicable in principle to an otherwise similar airbag module 102 whose airbag 104 includes multiple inflation chambers 120 and/or multiple inflation ports 122. Likewise, although the airbag module 102, as shown, includes one inflator 114, it will be understood that this disclosure is applicable in principle to an otherwise similar airbag module 102 including multiple inflators 114.

As part of the bordering area 124, the airbag 104 includes a mounting edge 130, a non-mounting edge 132, and two adjacent edges 134. The mounting edge 130 and the non-mounting edge 132, as well as the adjacent edges 134, are opposed with one another about the inflation chamber 120, with the adjacent edges 134 extending between the mounting edge 130 and the non-mounting edge 132. With the bordering area 124 otherwise closed around the inflation chamber 120, the inflation port 122 is formed as an opening through the bordering area 124 between the mounting edge 130 and one adjacent edge 134. As part of the mounting edge 130, the airbag 104 includes one or more securement adaptors 136 for securing the airbag 104, the straps 116, and the cases 118 with one another. Moreover, the airbag 104 includes one or more mounting tabs 138 for mounting the airbag 104 to the body 108 by the mounting edge 130. The securement adaptors 136 and the mounting tabs 138 project from the mounting edge 130, and are alternatingly spaced apart from one another along the mounting edge 130.

During the assembly of the airbag module 102, the airbag 104 is arranged in the packaged configuration P. Specifically, the airbag 104 is compacted to the packaged configuration P normally to the mounting edge 130 and the non-mounting edge 132. Upon its arrangement in the packaged configuration P, the airbag 104 has a tubular or otherwise elongate shape, with the mounting edge 130 extending exteriorly along the airbag 104. With the mounting edge 130 extending exteriorly along the airbag 104, the securement adaptors 136 and the mounting tabs 138 project from the mounting edge 130 exteriorly to the airbag 104.

In general, the body 108 is constructed from rigidly interconnected body elements and overlying body coverings. In the vehicle 100, the airbag 104, together with the remainder of the airbag module 102, is mounted to, and with its arrangement in the packaged configuration P, packaged within, the body 108 adjacent the passenger compartment 106. Specifically, with the airbag 104 arranged in the packaged configuration P, the airbag 104, the cases 118, and the inflator 114 extend along the body 108 behind any overlying body coverings, and are mounted to the body 108. The cases 118 are oriented with the airbag 104, and extend substantially along the length of the airbag 104. Although the airbag module 102, as shown, includes multiple (i.e., two) discontinuous cases 118, it will be understood that this disclosure is applicable in principle to an otherwise similar airbag module 102 including one continuous case 118. The airbag 104, together with the cases 118, is mounted to the body 108 by the mounting edge 130 using the mounting tabs 138.

In the vehicle 100, the airbag module 102 serves as a passive collision mitigation system for passengers in the passenger compartment 106. Specifically, the airbag module 102 principally functions when the vehicle 100 experiences a side impact, rollover, and/or other collision event. In response to a collision event, the inflator 114 is operable to inflate the airbag 104. The airbag 104, acting against the body 108 at the mounting edge 130, is thereby induced to expand to the deployed configuration D. Upon the initiation of its inflation-induced expansion to the deployed configuration D, in the airbag module 102, the airbag 104 breaks through the straps 116, and deploys from the cases 118. Moreover, in the vehicle 100, the airbag 104 passes through the body 108 by displacing any overlying body coverings. In the resulting deployed configuration D, the airbag 104 is deployed along the body 108 in the passenger compartment 106. From between passengers and the body 108, the airbag 104 is configured to prolong, distribute, and/or otherwise mitigate collision forces experienced by passengers as they come to rest against the body 108.

The airbag 104 is made from one or more materials suitable for its construction, arrangement in the packaged configuration P, mounting to the body 108, inflation-induced expansion to the deployed configuration D, and mitigation of collision forces experienced by passengers. For instance, the airbag 104 may be made from one or more flexible, durable, and impermeable or semi-impermeable fabrics, such as fabrics woven from polyamide, polyamide blends, polyester, polyester blends, and the like.

With respect to the illustrated airbag module 102 for the side curtain airbag 104, as part of the side 110, the body 108 includes an upright A-pillar 140, an upright B-pillar 142, an upright C-pillar 144, and a horizontal roof rail 146 above the A-pillar 140, the B-pillar 142, and the C-pillar 144. The A-pillar 140, the B-pillar 142, and the C-pillar 144 are longitudinally spaced apart from one another below the roof rail 146, with the A-pillar 140 forward of the B-pillar 142, and the B-pillar 142 forward of the C-pillar 144. At the roof rail 146, the side 110 shares a longitudinal junction with the roof 112. As a continuous rearward extension of the A-pillar 140, the roof rail 146 extends longitudinally between the A-pillar 140, the B-pillar 142, and the C-pillar 144. Moreover, the body 108 includes an A-pillar garnish 148, a B-pillar garnish 150, and a C-pillar garnish 152 overlying the A-pillar 140, the B-pillar 142, and the C-pillar 144, respectively, and a headliner 154 overlying, in relevant part, the roof rail 146.

At the side 110, the body 108 defines front and rear door openings 156A, 156B that open between the passenger compartment 106 and the exterior through the side 110. The front and rear door openings 156A, 156B are respectively between the A-pillar 140 and the B-pillar 142 and between the B-pillar 142 and the C-pillar 144 below the roof rail 146. Relatedly, as part of the side 110, the body 108 includes upright front and rear doors 158A, 158B respectively corresponding to the front and rear door openings 156A, 156B. As respective parts of the front and rear doors 158A, 158B, the body 108 defines front and rear door window openings 160A, 160B that open between the passenger compartment 106 and the exterior respectively through the front and rear doors 158A, 158B. Similar to the front and rear door openings 156A, 156B, the front and rear door window openings 160A, 160B are respectively between the A-pillar 140 and the B-pillar 142 and between the B-pillar 142 and the C-pillar 144 below the roof rail 146. Relatedly, the body 108 includes front and rear door windows 162A, 162B respectively corresponding to the front and rear door window openings 160A, 160B.

In the vehicle 100, the airbag 104, together with the remainder of the airbag module 102, is mounted to, and, with its arrangement in the packaged configuration P, packaged within, the side 110 overhead the passenger compartment 106. Specifically, with the airbag 104 arranged in the packaged configuration P, the airbag module 102 is generally horizontal, and extends longitudinally along the A-pillar 140 and the roof rail 146 behind the A-pillar garnish 148 and the headliner 154. As part of the airbag module 102, the airbag 104, the cases 118, and the inflator 114 extend, in relevant part, longitudinally along the roof rail 146 behind the headliner 154, with the inflator 114 rearward of the airbag 104 and the cases 118, and are mounted, in relevant part, to the roof rail 146. The airbag 104, together with the cases 118, is mounted to the roof rail 146 by the mounting edge 130 using the mounting tabs 138.

As noted above, in response to a collision event, the inflator 114 is operable to inflate the airbag 104. With the airbag 104 mounted to the roof rail 146 by the mounting edge 130, the airbag 104, acting against the roof rail 146 at the mounting edge 130, is thereby induced to downwardly expand to the deployed configuration D. Upon the initiation of its inflation-induced downward expansion to the deployed configuration D, in the vehicle 100, the airbag 104 passes through the side 110 by displacing the headliner 154. In the resulting deployed configuration D, the airbag 104 is deployed along the side 110 in the passenger compartment 106. As shown, as part of the airbag module 102, the airbag 104 extends longitudinally along the roof rail 146 above the B-pillar 142, the C-pillar 144, and the front and rear doors 158A, 158B. Correspondingly, in the deployed configuration D, the airbag 104 provides coverage along the side 110 vertically from the roof rail 146 across the upper portions of the B-pillar 142, the C-pillar 144, and the front and rear doors 158A, 158B, including the front and rear door windows 162A, 162B.

As shown with additional reference to FIGS. 2A, 2B, 3A-3C, and 4A-4C, the airbag module 102 packages the relatively flexible airbag 104 for handling, including transport, staging, and mounting to the body 108. In general, to ensure its proper inflation-induced expansion to the deployed configuration D, the airbag 104 is arranged in the packaged configuration P according to a defined compaction geometry, and mounted to the body 108 according to a defined mounting layout.

According to the compaction geometry, the airbag 104 is rolled, folded, and/or otherwise compacted to the packaged configuration P, and configured for inflation-induced unrolling, unfolding, and/or other expansion to the deployed configuration D. As shown, in a so-called "plus-one" fold implementation, commencing with the non-mounting edge 132 and culminating with the mounting edge 130, the airbag 104 is rolled and then folded to the packaged configuration P. Upon its arrangement in the packaged configuration P, the non-mounting edge 132, as part of an interior roll, extends interiorly along the airbag 104, and the mounting edge 130, as part of an overlapping exterior fold, extends exteriorly along the airbag 104. In addition to the interior roll that includes the non-mounting edge 132, the airbag 104 may include a reversely overlapping sub-exterior fold that leads to the mounting edge 130, and a reversely overlapping exterior fold that includes the mounting edge 130.

In association with the mounting layout, with the mounting edge 130 extending exteriorly along the airbag 104, the mounting edge 130 has a defined circumferential alignment. According to the mounting layout, the airbag 104 has a defined angular orientation dependent upon the circumferential alignment of the mounting edge 130. In relation to the circumferential alignment of the mounting edge 130 and the angular orientation of the airbag 104, along its length, the airbag 104 is generally unbent, untwisted, and/or otherwise unflexed.

Correspondingly, to package the airbag 104 for handling, upon the arrangement of the airbag 104 in the packaged configuration P, the airbag module 102 maintains the packaged configuration P, and locationally fixes the airbag 104, according to a collaborative relationship between the packaged configuration P, the mounting edge 130, the securement adaptors 136, the mounting tabs 138, the straps 116, and the cases 118. As part of the collaborative relationship, with the mounting edge 130 extending exteriorly along the airbag 104, the securement adaptors 136 and the mounting tabs 138 project from the mounting edge 130 exteriorly to the airbag 104. Moreover, the straps 116 and the securement adaptors 136 are mutually configured for securement with one another, the cases 118 and the securement adaptors 136 are mutually configured for securement with one another, and the cases 118 and the mounting tabs 138 are mutually configured for attachment with one another. This description follows with reference to representative examples of the securement adaptor 136, a representative mounting tab 138, representative examples of the strap 116, and representative examples of the case 118. However, it will be understood that this disclosure is applicable in principle to the other securement adaptors 136, the other mounting tabs 138, the other straps 116, and the other cases 118.

The strap 116 includes a flexible, breakable, non-adhesive, strip-like construction. Along its length, the strap 116 includes two endpieces 164. The endpieces 164 are spaced apart from one another along the strap 116 at or leading to its ends. With the airbag 104 arranged in the packaged configuration P, the strap 116 is sized to loop around the airbag 104, with the endpieces 164 reaching in opposite directions to the mounting edge 130. Correspondingly, the endpieces 164 are respectively configured to anchor to the mounting edge 130 and secure with the securement adaptor 136, thereby securing the strap 116 in a loop around the airbag 104 at the mounting edge 130.

Specifically, the strap 116 includes a first endpiece 164A configured to anchor to the mounting edge 130, and a second endpiece 164B configured to secure with the securement adaptor 136. For example, as shown for the strap 116 of FIGS. 2A, 2B, and 3A, the strap 116 includes a pair of endpieces 164 each configured to secure with the securement adaptor 136. In this example, one of the endpieces 164, by being configured to secure with the securement adaptor 136, is thereby configured to anchor to the mounting edge 130, and thus serves as the first endpiece 164A. As shown for this example, the endpieces 164 are formed as a pair of hole-like apertures through the strap 116 each configured to hook with the securement adaptor 136. For example, as shown for the strap 116 of FIGS. 4A-4C, with the second endpiece 164B being configured to secure with the securement adaptor 136, the first endpiece 164A is configured for fixation to the mounting edge 130. In this example, the first endpiece 164A, by being configured for fixation to the mounting edge 130, is thereby configured to anchor to the mounting edge 130. As shown for this example, the first endpiece 164A is formed as a length of the strap 116 stitched to the mounting edge 130, and the second endpiece 164B is formed as a lengthwise slit-like aperture through the strap 116 configured to hook with the securement adaptor 136.

Moreover, the strap 116 includes one or more break points 166 at which the strap 116 is configured to allow the airbag 104 to break therethrough upon the initiation of its inflation-induced expansion to the deployed configuration D. The break points 166 are spaced apart from one another along the strap 116 between the endpieces 164. As shown, each break point 166 may be formed as one or more crosswise slit-like apertures through the strap 116. Although the strap 116, as shown, includes multiple (i.e., three) break points 166, it will be understood that this disclosure is applicable in principle to an otherwise similar airbag module 102 whose strap 116 includes one break point 166.

The case 118 includes a rigid or otherwise supportive, open-faced, tube-like construction. With the airbag 104 arranged in the packaged configuration P, the case 118 is sized, shaped, and otherwise configured to fit over the airbag 104, including, with the strap 116 secured in a loop around the airbag 104 at the mounting edge 130, over the airbag 104 and the strap 116. As part of its construction, the case 118 includes a back wall 168, two adjacent walls 170, and a deployment opening 172. The back wall 168, the adjacent walls 170, and the deployment opening 172 extend along the case 118. The back wall 168 and the deployment opening 172, as well as the adjacent walls 170, are opposed with one another about the case 118, with the back wall 168 extending between the adjacent walls 170. The adjacent walls 170 are opposed with one another about the back wall 168, extend from the back wall 168 toward the deployment opening 172, and distally frame the deployment opening 172.

As shown, one of the adjacent walls 170 serves as a mounting edge wall 170A. As part of the mounting edge wall 170A, the case 118 includes a receiver 174 for the securement adaptor 136, and a slot 176 for the mounting tab 138. Moreover, at the junction between the back wall 168 and the mounting edge wall 170A, the case 118 includes a mounting bracket 178 for mounting the case 118 to the body 108. The receiver 174, in communication with the deployment opening 172, opens from the mounting edge wall 170A, and is configured to receive and secure with the securement adaptor 136. As a continuous extension of the back wall 168, the mounting bracket 178 projects from the mounting edge wall 170A exteriorly to the case 118, and is configured to attach with the mounting tab 138. Relatedly, the slot 176 is complementary to the mounting tab 138, and opens through the mounting edge wall 170A to the mounting bracket 178. With the slot 176 and the mounting bracket 178 paired with another along the case 118, the receiver 174 and the slot 176 and the mounting bracket 178 are spaced apart from one another along the case 118.

The securement adaptor 136 includes a rigid, stanchion-like construction. As part of the mounting edge 130, the securement adaptor 136 is configured to project therefrom exteriorly to the airbag 104, secure with the endpieces 164, and enter and secure with the receiver 174. As part of its construction, the securement adaptor 136 includes a plate-like base 180 configured for fixation to the mounting edge 130, and one or more projections 182 configured to secure with the endpieces 164 and enter and secure with the receiver 174. The base 180 extends along the mounting edge 130, and the securement adaptor 136 is fixed to the mounting edge 130 by the base 180. The projections 182 project from the base 180. With the securement adaptor 136 fixed to the mounting edge 130 by the base 180, the projections 182, beginning from the base 180, project from the mounting edge 130 exteriorly to the airbag 104. For example, as shown for the securement adaptor 136 of FIGS. 2A, 2B, 3A, and 3B, the base 180 extends between the back layer 126 and the front layer 128, and the back layer 126 and the front layer 128 are stitched, adhered, welded, and/or otherwise connected with one another around the base 180. With the base 180 extending between the back layer 126 and the front layer 128, the projections 182 project from the mounting edge 130 exteriorly to the airbag 104 through the front layer 128. For example, as shown for the securement adaptor 136 and the corresponding strap 116 of FIGS. 4A-4C, with the first endpiece 164A subjacent to the base 180, the base 180 and the first endpiece 164A are commonly stitched to the mounting edge 130. Although the securement adaptor 136, as shown, is a separate attachment fixed to the mounting edge 130, it will be understood that this disclosure is applicable in principle to an otherwise similar airbag module 102 whose airbag 104 includes a mounting edge 130 including a unitarily formed securement adaptor 136.

As shown, the securement adaptor 136 includes a first projection 182A configured to secure with the endpieces 164, and a second projection 182B configured to enter and secure with the receiver 174. For example, as shown for the securement adaptor 136 of FIGS. 2A, 2B, 3A, and 3B, the first projection 182A and the second projection 182B are formed as cylinder-bodied, button-headed studs. In this example, the first projection 182A is configured to hook with the endpieces 164, and enter and slidingly engage with the receiver 174, and the second projection 182B is configured to enter and snap-fit with the receiver 174. For example, as shown for the securement adaptor 136 of FIGS. 4A-4C, the first projection 182A is formed as a tab, and the second projection 182B is formed as a clip. In this example, with the first endpiece 164A fixed to the mounting edge 130, the first projection 182A is configured to hook with the second endpiece 164B, and the second projection 182B is configured to enter and clip with the receiver 174. Although the securement adaptor 136, as shown, includes the first projection 182A and the second projection 182B, it will be understood that this disclosure is applicable in principle to an otherwise similar airbag module 102 whose airbag 104 includes a mounting edge 130 including a securement adaptor 136 that otherwise includes at least one projection 182.

Figure 2A:
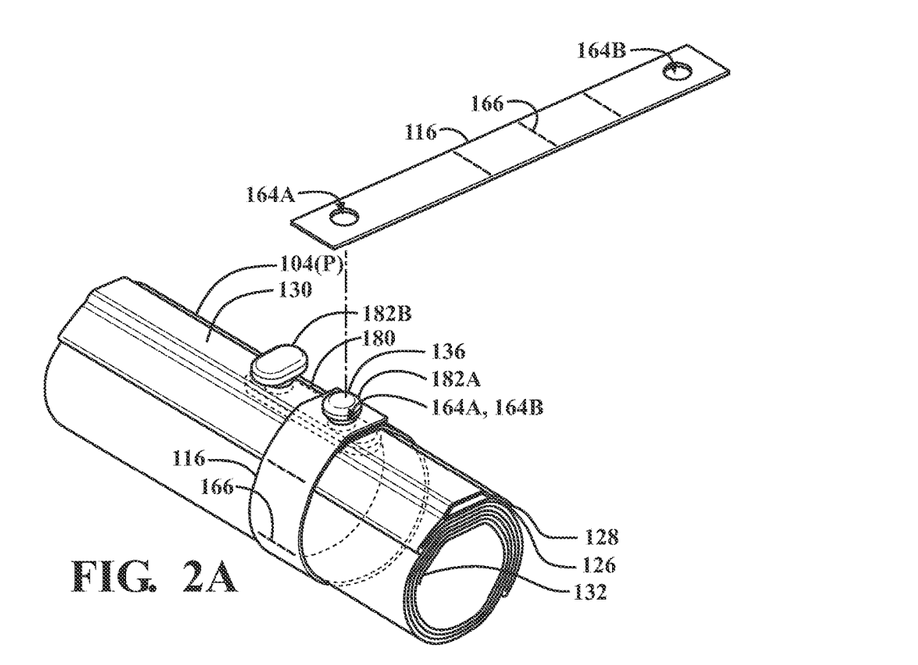
FIGS. 2A and 3A are a partial assembly view of the airbag module and a corresponding cross-sectional view of the vehicle taken along the line 3A-3A in FIG. 1A, showing aspects of a strap being secured in a loop around the airbag at the mounting edge using a securement adaptor.
Figure 3A:
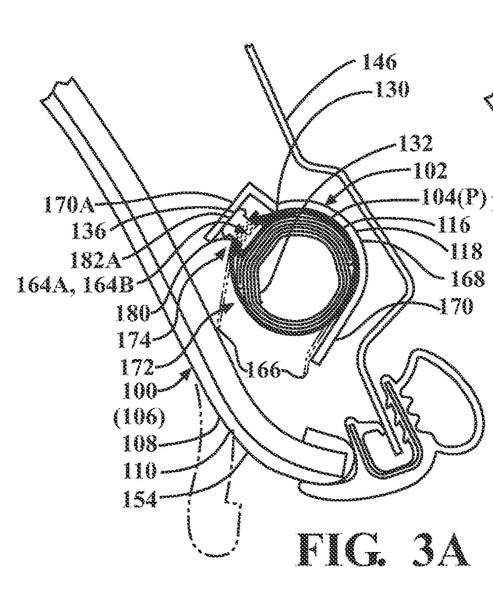
Figure 4A:
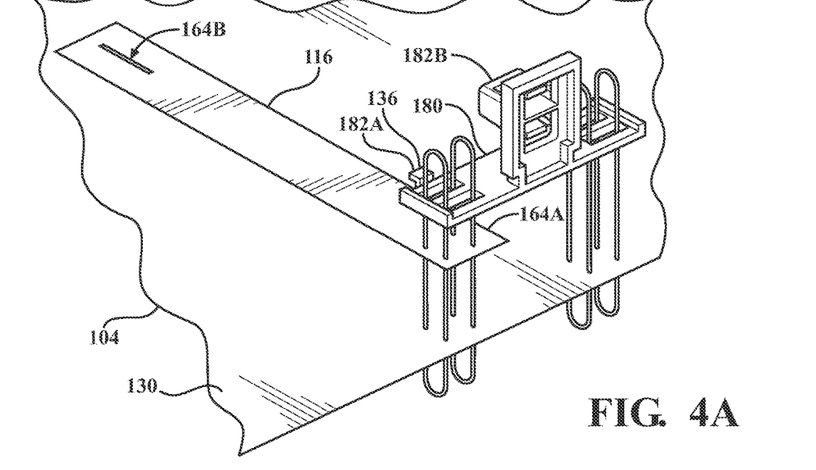
FIGS. 4A and 4B are partial assembly views of the airbag module, showing aspects of a strap being secured in a loop around the airbag at the mounting edge using a securement adaptor.
Figures 4B, 4C:
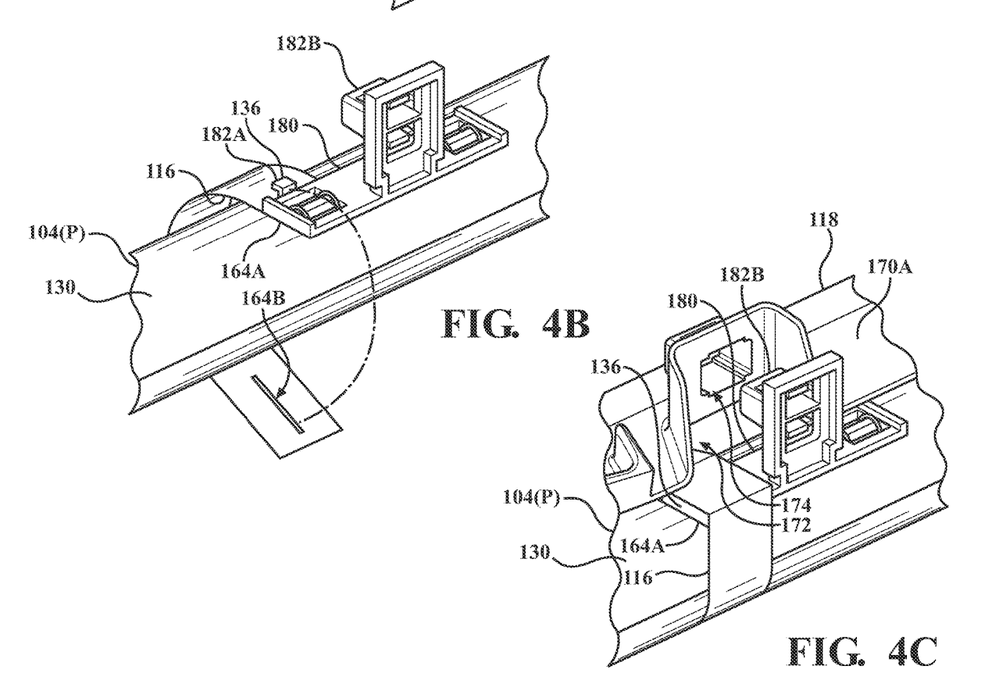
FIG. 4C is a partial assembly view of the airbag module, showing aspects of a case being secured with a securement adaptor.

As shown with particular reference to FIGS. 2A, 3A and 4B, during the assembly of the airbag module 102, the strap 116 is looped around the airbag 104, and secured in a loop around the airbag 104 at the mounting edge 130. Specifically, with the endpieces 164 reaching in opposite directions to the mounting edge 130, the endpieces 164 are respectively anchored to the mounting edge 130 and secured with the securement adaptor 136.

For example, as shown for the securement adaptor 136 and the corresponding strap 116 of FIGS. 2A, 2B, 3A, and 3B, the endpieces 164 are complementary to the first projection 182A. In this example, with the first projection 182A formed as a stud and the endpieces 164 formed as a pair of apertures, to secure each of the endpieces 164 with the securement adaptor 136, the endpieces 164 are each hooked with the first projection 182A. Specifically, the endpieces 164, having each been landed on the first projection 182A past its head, are hooked overlappingly with the first projection 182A along its body. For example, as shown for the securement adaptor 136 and the corresponding strap 116 of FIGS. 4A-4C, with the first endpiece 164A fixed to the mounting edge 130, the second endpiece 164B is complementary to the first projection 182A. In this example, with the first projection 182A formed as a tab and the second endpiece 164B formed as an aperture, to secure the second endpiece 164B with the securement adaptor 136, the second endpiece 164B is hooked with the first projection 182A.

Figure 2B:
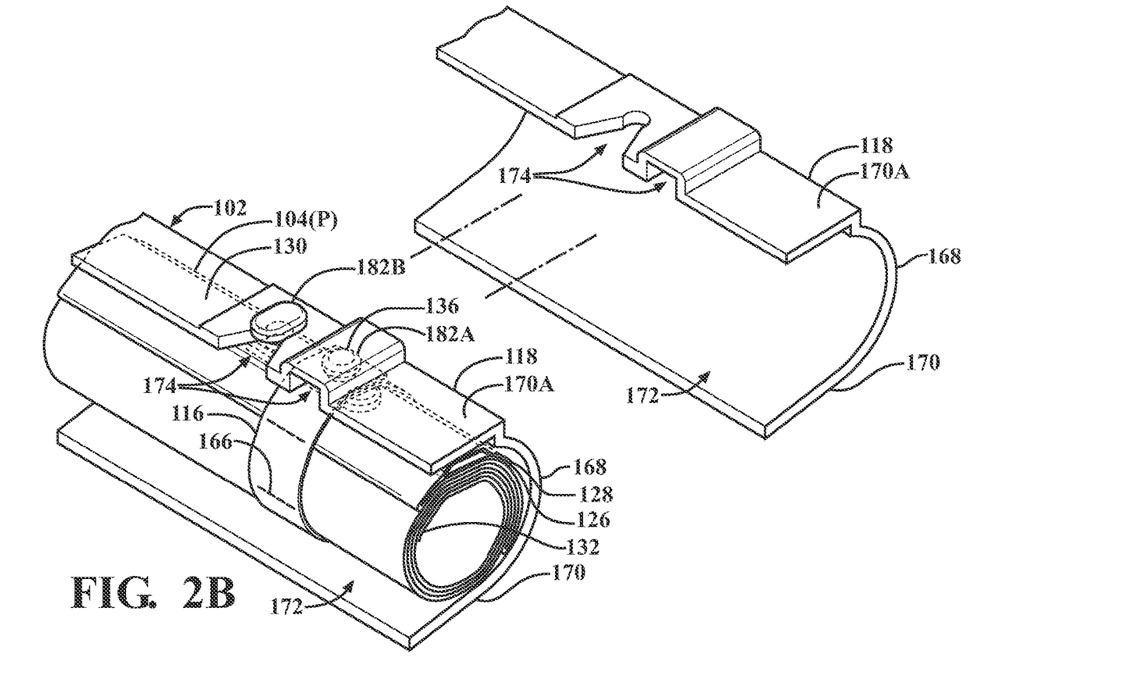
FIGS. 2B and 3B are a partial assembly view of the airbag module and a corresponding cross-sectional view of the vehicle taken along the line 3B-3B in FIG. 1A, showing aspects of a case being secured with a securement adaptor.
Figure 3B:
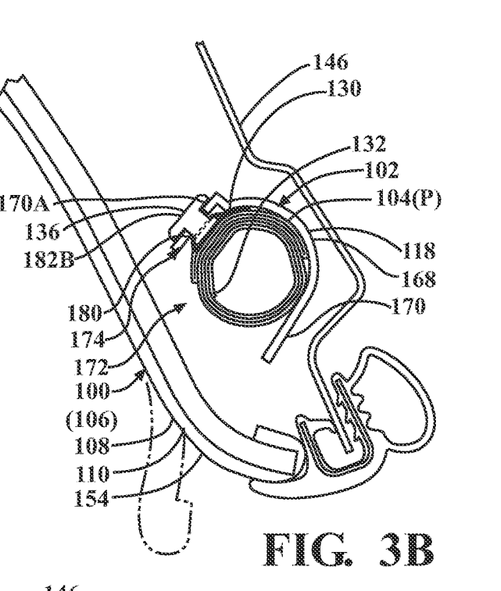

As shown with particular reference to FIGS. 2B, 3B and 4C, in furtherance of the assembly of the airbag module 102, the case 118 is fitted over the airbag 104, including, with the strap 116 secured in a loop around the airbag 104 at the mounting edge 130, over the airbag 104 and the strap 116. To fit the case 118 over the airbag 104, the airbag 104 is backed into the case 118. Specifically, with the mounting edge 130 parallel to the mounting edge wall 170A, and the break points 166 facing away from the deployment opening 172, the airbag 104 is backed into the case 118 through the deployment opening 172. It will be understood that, upon the initiation of its inflation-induced expansion to the deployed configuration D, the airbag 104 breaks through the strap 116 at the break points 166, and deploys from the case 118 back through the deployment opening 172.

Upon the fitment of the case 118 over the airbag 104, the mounting edge wall 170A extends over the mounting edge 130. In association with its fitment over the airbag 104, the case 118 is secured with the securement adaptor 136. Specifically, with the receiver 174 opening from the mounting edge wall 170A, the receiver 174 receives and secures with the securement adaptor 136.

For example, as shown for the securement adaptor 136 and the corresponding receiver 174 of FIGS. 2A, 2B, 3A, and 3B, the receiver 174 is complementary to the first projection 182A and the second projection 182B. In this example, with the first projection 182A and the second projection 182B formed as studs, to receive and secure with the securement adaptor 136, the receiver 174 opens distally from the mounting edge wall 170A, parallelly receives and slidingly engages with the first projection 182A, and parallelly receives and secures with the second projection 182B. Specifically, the receiver 174 is formed in two parts as a closed-topped track configured to parallelly receive and slidingly engage with the first projection 182A at its head, and an open-topped chute configured to parallelly receive and distally snap-fit with the second projection 182B along its body. For example, as shown for the securement adaptor 136 and the corresponding receiver 174 of FIGS. 4A-4C, the receiver 174 is complementary to the second projection 182B. In this example, with the second projection 182B formed as a clip, to receive and secure with the securement adaptor 136, the receiver 174 opens distally from the mounting edge wall 170A, and parallelly receives and secures with the second projection 182B. Specifically, the receiver 174 is formed in part as a clip retainer configured to parallelly receive and clip with the second projection 182B.

Figure 3C:
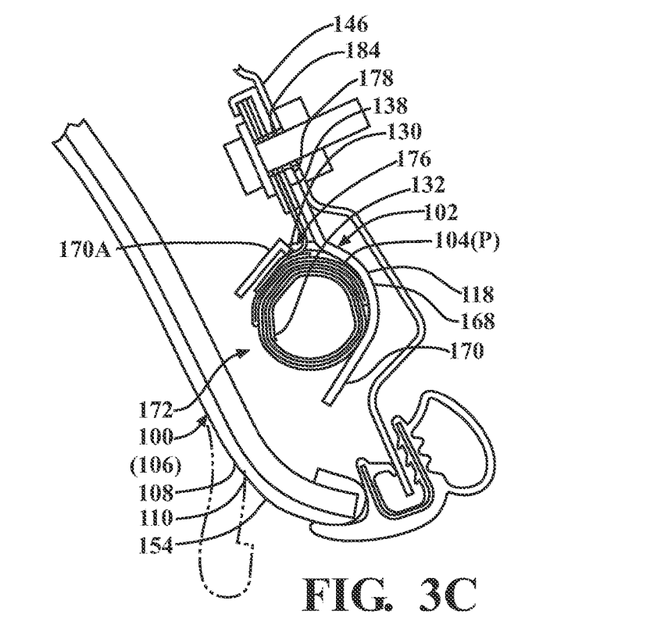
FIG. 3C is a cross-sectional view of the vehicle taken along the line 3C-3C in FIG. 1A, showing aspects of a case being attached with a mounting tab.

As shown with particular reference to FIG. 3C, the case 118 is also attached with the mounting tab 138. Specifically, with the slot 176 opening through the mounting edge wall 170A to the mounting bracket 178, the mounting tab 138 projects from the mounting edge 130 exteriorly to the airbag 104 to the mounting bracket 178 through the slot 176, and the mounting bracket 178 is attached with the mounting tab 138. With the mounting bracket 178 attached with the mounting tab 138, the vehicle 100 includes a fastener 184 for mounting the airbag 104, together with the case 118, to the body 108 by the mounting edge 130 using the mounting tab 138. As shown, with a configuration typical of screws, bolts, and the like, the fastener 184 is engaged with the mounting tab 138, and extends from the mounting tab 138 to the body 108 through the mounting tab 138 and the mounting bracket 178 for securement to the body 108. Specifically, with respect to the illustrated airbag module 102 for the side curtain airbag 104, the fastener 184 extends from the mounting tab 138 to the roof rail 146 through the mounting tab 138 and the mounting bracket 178 for securement to the roof rail 146.

Upon its securement in a loop around the airbag 104 at the mounting edge 130, the strap 116 maintains the packaged configuration P. Upon its fitment over the airbag 104, the case 118 supports the airbag 104 for ease of handling, and protects the airbag 104 against stress, wear, damage, and the like. Upon the securement of the case 118 with the securement adaptor 136, individually and in combination with the attachment of the case 118 with the mounting tab 138, the mounting edge 130 is locationally fixed to the case 118.

Specifically, the mounting edge 130 is locationally fixed to the case 118 along the mounting edge wall 170A. With the mounting edge 130 locationally fixed to the case 118, the case 118 supports the mounting edge 130 against circumferential misalignment. Moreover, the case 118 supports the airbag 104 against angular misorientation, as well as bending, twisting, and/or otherwise flexing. Moreover, upon the attachment of the case 118 with the mounting tab 138, the case 118 supports the airbag 104 for ease of mounting to the body 108 by the mounting edge 130 using the mounting tab 138.

As noted above, upon its securement in a loop around the airbag 104 at the mounting edge 130, the strap 116 maintains the packaged configuration P. With the endpieces 164 respectively anchored to the mounting edge 130 and secured with the securement adaptor 136, compared to applying adhesive tape around the airbag 104, the strap 116 advantageously promotes user-friendly, errorproof, and reliable anchoring and securement. Moreover, the strap 116 is not secured around the airbag 104 apart from the mounting edge 130. Accordingly, compared to applying adhesive tape around the airbag 104, the strap 116 advantageously maintains the packaged configuration P without influencing the circumferential alignment of the mounting edge 130.

Moreover, with the strap 116 secured in a loop around the airbag 104 at the mounting edge 130, and the case 118 fitted over the airbag 104 and the strap 116, the strap 116 is not secured across the airbag 104 and the case 118. Accordingly, compared to applying adhesive tape around the airbag 104 and the case 118, the strap 116 advantageously maintains the packaged configuration P without influencing the angular orientation of the airbag 104. Moreover, with the securement adaptor 136 and the mounting tab 138 spaced apart from one another along the mounting edge 130, the location of the strap 116 along the mounting edge 130 is not dictated by the location of the mounting tab 138. Accordingly, compared to integration with features for mounting the airbag 104 to the body 108 by the mounting edge 130, the strap 116 is advantageously locatable along the mounting edge 130 at the location best suited for maintaining the packaged configuration P.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag module, comprising:
   a curtain airbag arranged in a packaged configuration, the airbag including a mounting edge extending exteriorly along the airbag, the mounting edge including a securement adaptor and a mounting tab projecting therefrom exteriorly to the airbag; and
   a strap looped around the airbag, the strap including two endpieces respectively anchored to the mounting edge and secured with the securement adaptor, thereby securing the strap in a loop around the airbag at the mounting edge; wherein
   the securement adaptor and the mounting tab are spaced apart from one another along the mounting edge, with the securement adaptor but not the mounting tab usable for securing the strap in a loop around the airbag at the mounting edge, and the mounting tab but not the securement adaptor usable for mounting the airbag by the mounting edge.

2. The airbag module of claim 1, wherein the endpieces are each secured with the securement adaptor.

3. The airbag module of claim 1, wherein the securement adaptor includes at least one projection projecting from the mounting edge exteriorly to the airbag, the endpieces each hooked with the at least one projection.

4. The airbag module of claim 1, wherein the endpieces are respectively fixed to the mounting edge and secured with the securement adaptor.

5. The airbag module of claim 1, wherein the securement adaptor includes at least one projection projecting from the mounting edge exteriorly to the airbag, the endpieces respectively fixed to the mounting edge and hooked with the at least one projection.

6. The airbag module of claim 1, wherein the strap includes a break point between the endpieces.

7. The airbag module of claim 1, further comprising:
   a case fitted over the airbag and the strap, the case including a mounting edge wall extending along the case over the mounting edge, the mounting edge wall including a receiver receiving the securement adaptor.

8. The airbag module of claim 1, further comprising:
   a case fitted over the airbag and the strap, the case including a mounting edge wall extending along the case over the mounting edge, the mounting edge wall including a receiver receiving and secured with the securement adaptor.

9. An airbag module, comprising:
   a curtain airbag arranged in a packaged configuration, the airbag including a mounting edge extending exteriorly along the airbag, the mounting edge including a securement adaptor and a mounting tab projecting therefrom exteriorly to the airbag, the securement adaptor and the mounting tab spaced apart from one another along the mounting edge;
   a strap looped around the airbag, the strap including two endpieces respectively anchored to the mounting edge and secured with the securement adaptor, thereby securing the strap in a loop around the airbag at the mounting edge; and
   a case fitted over the airbag and the strap, the case including a mounting edge wall extending along the case over the mounting edge, and a mounting bracket projecting from the mounting edge wall exteriorly to the case, the mounting edge wall including a receiver, and a slot opening therethrough to the mounting bracket, the receiver and the slot and the mounting bracket spaced apart from one another along the case, the receiver receiving and secured with the securement adaptor, and with the mounting tab projecting to the mounting bracket through the slot, the mounting bracket attached with the mounting tab.

10. The airbag module of claim 9, wherein the securement adaptor includes at least one projection projecting from the mounting edge exteriorly to the airbag, the receiver receiving and secured with the at least one projection.

11. The airbag module of claim 10, wherein the endpieces are each hooked with the at least one projection.

12. The airbag module of claim 10, wherein the endpieces are respectively fixed to the mounting edge and hooked with the at least one projection.

13. The airbag module of claim 9, wherein the strap includes a break point between the endpieces.

14. An airbag module, comprising:
a curtain airbag arranged in a packaged configuration, the airbag including a mounting edge extending exteriorly along the airbag, the mounting edge including a securement adaptor, the securement adaptor including at least one projection projecting from the mounting edge exteriorly to the airbag;
a strap looped around the airbag, the strap including two endpieces respectively anchored to the mounting edge and hooked with the at least one projection, thereby securing the strap in a loop around the airbag at the mounting edge; and
a case fitted over the airbag and the strap, the case including a mounting edge wall extending along the case over the mounting edge, the mounting edge wall including a receiver receiving and secured with the at least one projection.

15. The airbag module of claim 14, wherein the endpieces are each hooked with the at least one projection.

16. The airbag module of claim 14, wherein the securement adaptor includes a first projection and a second projection projecting from the mounting edge exteriorly to the airbag, the endpieces each hooked with the first projection, and the receiver receiving and slidingly engaged with the first projection, and receiving and snap-fit with the second projection.

17. The airbag module of claim 14, wherein the endpieces are respectively fixed to the mounting edge and hooked with the at least one projection.

18. The airbag module of claim 14, wherein the securement adaptor includes a first projection and a second projection projecting from the mounting edge exteriorly to the airbag, the endpieces respectively fixed to the mounting edge and hooked with the first projection, and the receiver receiving and clipped with the second projection.

19. The airbag module of claim 14, wherein the strap includes a break point between the endpieces.

20. An airbag module, comprising:
a curtain airbag arranged in a packaged configuration, the airbag including a mounting edge extending exteriorly along the airbag, the mounting edge including a securement adaptor, the securement adaptor including a base formed as a plate extending along the mounting edge, and at least one projection projecting from the base normally thereto, the securement adaptor fixed to the mounting edge by the base, and the at least one projection, beginning from the base, projecting from the mounting edge exteriorly to the airbag; and
a strap looped around the airbag, the strap including two endpieces respectively anchored to the mounting edge and hooked with the at least one projection, thereby securing the strap in a loop around the airbag at the mounting edge.

* * * * *